United States Patent [19]
White et al.

[11] Patent Number: 5,834,105
[45] Date of Patent: Nov. 10, 1998

[54] CORN-BASED STRUCTURAL COMPOSITES

[75] Inventors: Scott R. White; Nancy R. Sottos, both of Champaign; Thomas A. Mackin, Urbana, all of Ill.

[73] Assignee: The Board of Trustees of the University of Illinois, Urbana, Ill.

[21] Appl. No.: 580,669

[22] Filed: Dec. 29, 1995

[51] Int. Cl.⁶ .................................. B32B 5/22; B32B 5/28
[52] U.S. Cl. ...................... 428/297.4; 428/413; 428/480; 428/532; 428/105; 428/109; 428/114; 428/298.1; 428/300.7
[58] Field of Search .................................. 428/413, 480, 428/532, 105, 109, 114, 297.4, 298.1, 300.7

[56] References Cited

U.S. PATENT DOCUMENTS

| | | | |
|---|---|---|---|
| 3,927,235 | 12/1975 | Chow | 428/302 |
| 4,016,117 | 4/1977 | Griffin | 260/17.4 ST |
| 4,133,784 | 1/1979 | Otey et al. | 260/17.4 ST |
| 4,144,304 | 3/1979 | Dereppe et al. | 264/175 |
| 4,402,751 | 9/1983 | Wilde | 106/93 |
| 4,405,542 | 9/1983 | Greer | 264/109 |
| 4,420,576 | 12/1983 | Griffin | 524/47 |
| 4,479,912 | 10/1984 | Bullock | 264/23 |
| 4,528,309 | 7/1985 | Göte et al. | 524/13 |
| 4,627,951 | 12/1986 | Shen | 264/109 |
| 5,151,238 | 9/1992 | Earl et al. | 264/136 |
| 5,194,461 | 3/1993 | Bergquist et al. | 524/13 |
| 5,354,621 | 10/1994 | Liebermann | 428/532 |
| 5,411,691 | 5/1995 | Hwang | 264/115 |

FOREIGN PATENT DOCUMENTS 0 556 557 A1   8/1993   European Pat. Off. .

OTHER PUBLICATIONS

The English translation of EP 0 556 557 A1, 1993.
WPIDS abstract of EP 0 556 557 A1, 1993.
Webster's II New Riverside University Dictionary, The Riverside Publishing Company, p. 197, 1984.
Alexander RJ. Industrial Uses of Dry–Milled Corn Products. 58th Annual Meeting of the American Association of Cereal Chemists. Nov. 4–8, 1973, pp. 303–315.
Corn Refiners Association, Inc. Corn Starch. 4th Ed., 1979. Washington D.C., pp. 1–36.
Doane WM, Swanson CL and Fanta GF. Emerging Polymeric Materials Based on Starch. American Chemical Society, 1992, pp. 197–230.

(List continued on next page.)

Primary Examiner—Kathleen Choi
Attorney, Agent, or Firm—Wood, Phillips, VanSanten, Clark & Mortimer

[57] ABSTRACT

A structural polymeric composite containing corn-based material is provided. In one embodiment, a polymeric composite is a laminated polymeric composite that contains a fibrous component of corn. A method of making a structural composite using corn-based material is also provided.

5 Claims, 2 Drawing Sheets

OTHER PUBLICATIONS

Ekhoff SR. Concerting Corn into Food and Industrial Products. Illinois Research, 1992, pp. 19–23.

Gertjejansen RO. Properties of Particle Board from Sunflower States and Aspen Planer Shavings. VII International Sunflower conference, Krasnodar, USSR, Jun. 27–Jul. 3, 1976.

Gould JS, Gordon SH, Dexter LB, and Swanson CL. Biodegradation of Starch–Containing Plastics. American Chemical Society, 1990, pp. 66–75.

Jain S, Kumar R and Jindal UC. Mechanical Behavior of Bamboo and Bamboo Composite, Journal of Materials Science 27 (1992) 4598–4604.

Otey FH, Westhoff RP, and Doane WM. Starch–Based Blown Films. Ind. Eng. Chem. Prod. Res. Dev. 19:4, 592–595. 1980.

Paramasivam T and Abdul Kalam APJ. On the Study of Indigenous Natural–Fibre Composites. Fibre Science and Technology, 7:85–88. 1974.

Satyanarayana KG, Sukumaran K, Kulkarni AG, Pillai SGK, and Rohatgi PK. Performance of Banana Fabric–Polyester Resin Composites. In Composite Structures, ed. by IH Marshall, applied Science Publishers, London, 1983, pp. 535–548.

Satyanarayana KG, Kulkarni AG, Sukumaran K, Pillai SGK, Cherian A, and Rohatgi PK. On the Possibility of Using Natural Fibre Composites. In Composite Structures, ed. by IH Marshall, applied Science Publishers, London, 1983, pp. 618–632.

White SR, Sottos NR, and Mackin TJ. Fabrication and Characterization of Composite Materials With Corn Based Reinforcements. In Design and Manufacture of composites, ed. by NR Sottos, MD–vol. 69–1, ASME, New York, pp. 167–174. 1995.

CORN-BASED STRUCTURAL COMPOSITES

TECHNICAL FIELD OF THE INVENTION

The field of this invention is structural polymeric composites. More particularly, the present invention pertains to polymeric matrices and laminated polymeric composites containing particulate by-products of corn or fibrous components of corn.

BACKGROUND OF THE INVENTION

Interest in natural products as renewable raw materials for industrial products has greatly intensified in the past fifteen years. Over-production in agricultural markets has led to an abundant supply of renewable resources and has created a driving force to develop new markets for these products. Ground sunflower stalks have been used as a raw material for particle board. However, due to low internal bond strength however, it was concluded that sunflower stalks made an acceptable particle board only for interior applications. Bamboo has also been utilized as a reinforcement in laminated structures. Tensile, flexure and impact strengths of bamboo fiber-reinforced plastic were measured and the bamboo composites were deemed commercially viable for structural applications.

About 9% of the total corn crop grown in the United States is currently used for non-food, industrial applications. Corn products produced by both wet milling and dry milling processes have continued to find new uses in non-food applications. The starch produced by wet milling has been successfully used as a filler for biodegradable plastics and styrofoam. The corn flour produced by dry millers has been used in numerous industrial applications including various building materials such as gypsum board, fiberboard and ceiling tiles, biodegradable plastics and paper.

In each of these applications, the corn starch or flour serves as a particulate constituent in what is essentially a composite material. In the manufacture of gypsum board, acid modified corn flour was gelatinized in-situ during drying of the board and served to control the rate of water loss during the drying. The soluble carbohydrates also aided in controlling the rate of crystallization of the gypsum, creating a strong bond between gypsum and its paper liner.

The existing uses of corn as a constituent of composites require processing of the corn (e.g., forming meal or starch). Further, those uses typically employ those parts of corn that are used for food production (e.g., kernels, cobs). There continues to be a need for composite materials that contain non-food components of corn and which composites can be made without preprocessing those components.

BRIEF SUMMARY OF THE INVENTION

The present invention provides compositions and methods relating to structural composites containing fibrous components of corn. A structural composite of the present invention is a laminated polymer composite that contains a fibrous component of a corn plant and a polymeric resin.

A laminated polymeric structural composite can be prepared by mixing a fibrous component of corn and a polymeric matrix and laminating the mix. The present invention also provides laminated structural composites formed by such processes.

Composites of the present invention have mechanical properties equal or greater than those of wood-based composites such as oriented strand board. An advantage of using fibrous corn components (e.g., husks) is that such components are readily available from what is considered a waste product of corn processing. The use of otherwise discarded husks without any additional processing, provides enormous economic savings.

BRIEF DESCRIPTION OF THE DRAWINGS

In the drawings, which form a portion of the specification.

DETAILED DESCRIPTION OF THE INVENTION

Figure 1:
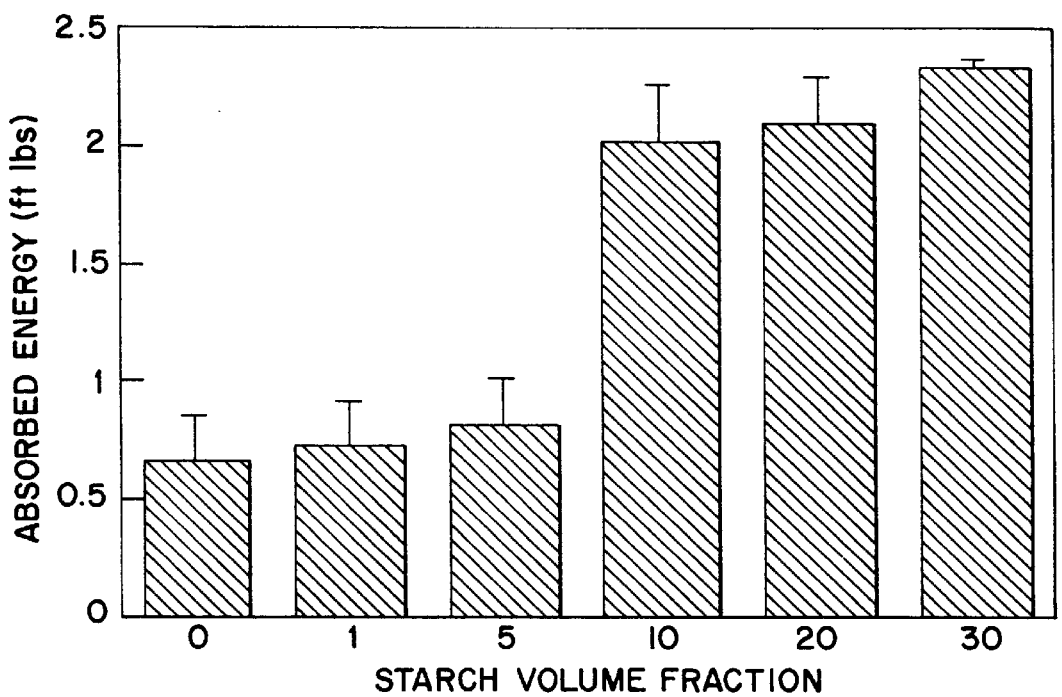
FIG. 1 shows the impact strength as a function of volume fraction of a corn starch additive in polyester.

In one aspect, the present invention provides a structural polymeric composite that comprises a corn-based reinforcement. The corn-based reinforcement is a fibrous part of a corn plant such as the husks or stalks. A structural composite is a laminated polymer where the fibrous corn element serves as a primary reinforcement.

Any polymer matrix suitable for structural composites can be used to form a composite. Exemplary and preferred polymer matrices are epoxy resin, phenol-formaldehyde, polyester, polypropylene, polyethylene and the like. The selection of a particular matrix for inclusion in a composite of the present invention depends to a large extent on the desired use of the formed composite. By way of example, composites formed with epoxy resins are suitable for decorative-structural elements (e.g., counter-tops) while composites formed with phenol-formaldehyde or polyesters are suitable for mechanical-structural uses where mechanical strength is important. An especially preferred polymer matrix is phenol-formaldehyde, which is used to form oriented strand board.

A laminated polymer composite is prepared by mixing the fibrous corn component with the polymer matrix and then laminating the mixture. The laminated polymer composite can be a quasi-unidirectional laminate (FIG. 4) where the fibers of the fibrous component are aligned or a quasi-isotropic laminate (FIG. 5) where the fibrous component is randomly aligned relative to the plane of the laminate.

To form a quasi-unidirectional laminate, a stack is formed by alternately layering the fibrous component with layers of the polymer matrix. The polymer matrix can be added in the form of a liquid or powder. When forming a stack of fibrous components, a liquid matrix is preferred.

The fibrous component is corn husks or corn stalks. Corn husks are preferred because they can be used directly without any preparatory steps. Where corn stalks are used, it is necessary to remove pith from the stalk prior to mixture with the polymer matrix.

Composites can also be made simply by mixing husks with powdered or liquid polymer matrix. Typically, the husks and polymer are mixed in blender. After mixing (or forming the stack) the husk/polymer matrix mix is laminated using standard procedures well known in the art.

Lamination is accomplished by compressing the mixture under pressure at an elevated temperature. Both the temperature and pressure can vary over a wide range. The only limitations on temperature are 1) temperature must be sufficiently high to allow for compression and 2) temperature must not exceed the temperature at which degradation of the husk or polymer matrix occurs. Hot compressing typically occurs with temperatures of from about 50° C. to about 100° C. and, more preferably from about 70° C. to about 90° C. Temperature should be kept below 120° C. Pressure is typically from about 40 to about 60 psi.

Compression continues for a period of time suitable to compress the mixture to a desired density. Typically, compression continues, as is well known in the art, until there are no visible sign of porosity in the formed composite. Compression time will vary with compression temperature and pressure. Generally, compression time decreases as pressure and temperature increase. Where the temperature is about 80° C., compression or curing time is about 1 hour.

To facilitate handling of the formed composite, the mixture or stack is typically placed in a mold coated with a releasing agent. After compression, the composite is cooled and removed from the mold. The composite can then be cut and shaped as desired. Composites of any desired thickness can be prepared. To avoid overheating of the inner most portions of the composite, it is preferred to maintain thickness during compression at less than about 25 mm. Composites of greater thickness can be prepared by forming thinner composites and then compressing those composites together. A detailed description of the preparation of laminated polymer composites using corn husks can be found hereinafter in Example 2.

The following Examples illustrate preferred embodiments of the present invention and are not limiting of the specification and claims in any way.

EXAMPLE 1

Polymeric Matrix

To make starch filled composites, a specific volume fraction of starch particles was mixed thoroughly with the chosen polymer and then poured into silicon rubber or metal molds. For these studies, orthophthalic polyester (Superior Co.) was chosen for the matrix. The starch-polyester composites were allowed to cure for 24 hrs at room temperature and then post cured at 40° C. for another 24 hrs to insure full crosslinking. The processing temperatures are well below the gelatinization temperature of starch, so that the granule integrity was maintained. The starch/polyester was molded into circular 102 mm diameter ×6 mm thick discs for impact testing or into 6 mm thick dog-bone coupons (125 mm gage length) for tensile testing. Impact and tension tests were used to establish the baseline properties of the corn reinforced composite materials.

A Dynatup model 8250 drop tower was used to measure the impact resistance of the materials. A 12 mm diameter hemispherical instrumented striker impacts the center of a specimen that is circumferentially clamped over a 76 mm hole in a support base. Data is collected through the duration of the impact event to assess the load at the onset of damage, the peak impact load, and the energy absorption during the impact event. Results of impact tests on the corn-starch reinforced materials are shown in FIG. 1. Significant improvement in absorbed energy was found for starch content greater than 5% volume fraction.

Figure 3:
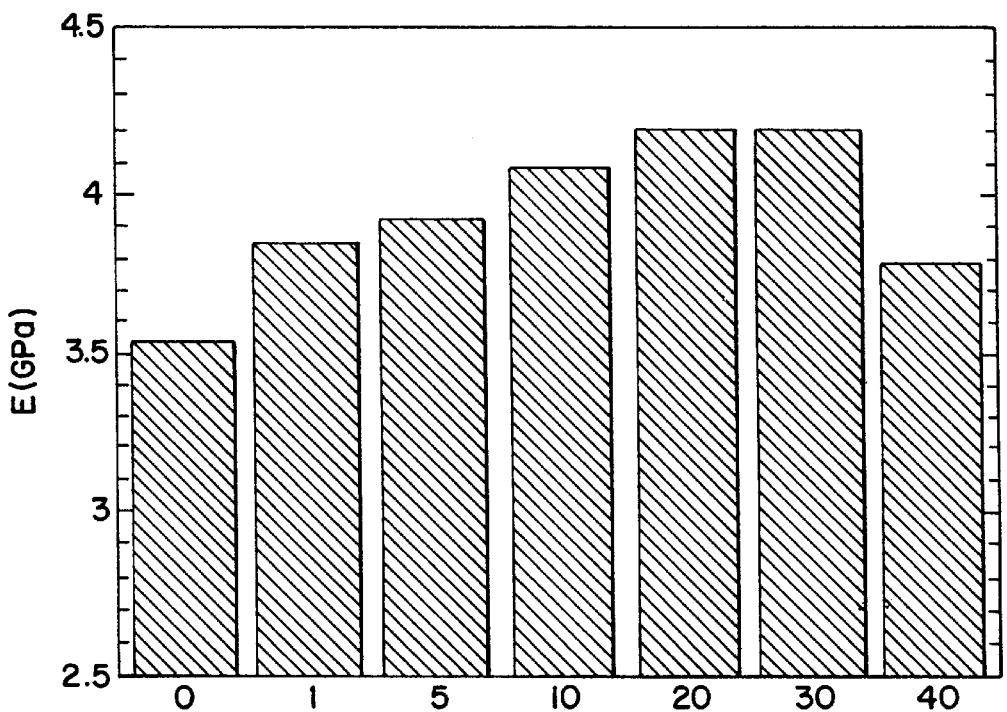
FIG. 3 shows the elastic modulus as a function of volume fraction of corn starch in a polyester.

Tensile tests were used to determine the elastic properties as well as the ultimate strengths. Tensile specimens were tested using a standard Instron machine with a 5000 lb load cell and a clip-gage extensometer. The elastic moduli measured from tensile tests of starch reinforced polyesters are shown in FIG. 3. As the starch content was increased, the elastic modulus was also found to increase reaching a maximum value between 20 and 30% volume fraction. Overall, an increase in modulus of about 20% was achieved.

EXAMPLE 2

Laminated Polymer Composite

Figure 4:
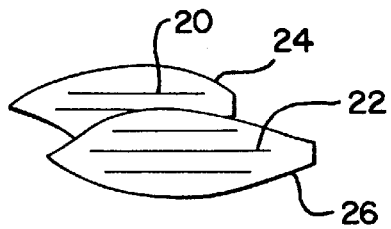
FIG. 4 is a plan view of a quasi-unidirectional laminated composite according to an embodiment of the present invention.
Figure 5:
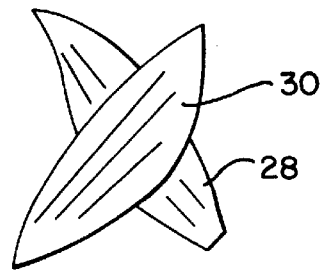
FIG. 5 is a plan view of a quasi-isotropic laminated composite according to another embodiment of the present invention.
Figure 6:
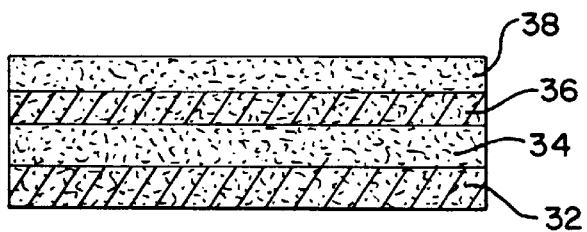
FIG. 6 is a cross-sectional view of the laminated composite according to the present invention.

Two types of husk laminates were made. Both types used an epoxy resin as the matrix. The first was a quasi-unidirectional lay-up in which the fibers 20, 22 of the husks 24, 26 were all aligned in the same general direction (FIG. 4). These laminates were used to obtain unidirectional mechanical test specimens so that upper and lower bounds could be obtained on tensile strength and stiffness. The second type of laminate was a quasi-isotropic lay-up in which the husks 28, 30 were chopped into short segments (up to 50 mm in length) and randomly distributed in the plane of the laminate (FIG. 5).

Both types of laminates were manufactured by hot pressing using a Tetrahedron MTP-14 laboratory hot press. A rectangular aluminum mold (203 mm×203 mm) was fabricated with a matching upper caul plate. The lay-up sequence was similar to that used in the aerospace industry. The mold was first coated with a releasing agent and then a gel coat was placed on the mold surface. The first layer of husks 32 were then placed onto the mold surface and coated with resin 34. Another layer of husks 36 was then deposited onto the first and coated with more resin 38. This sequencing was continued until the laminate thickness reached 12–13 mm. Next, a peel ply was placed on top of the laminate, followed by four plies of bleeder cloth and a release film.

The upper caul plate was then placed on top of the lay-up and the mold was transferred to the hot press. The cure schedule for these laminates called for maintaining 50 psi compaction pressure during cure at 80° for one hour. During curing approximately 50% compaction in thickness occurs. Final thicknesses were measured to be between 6 and 7 mm.

Figure 2:
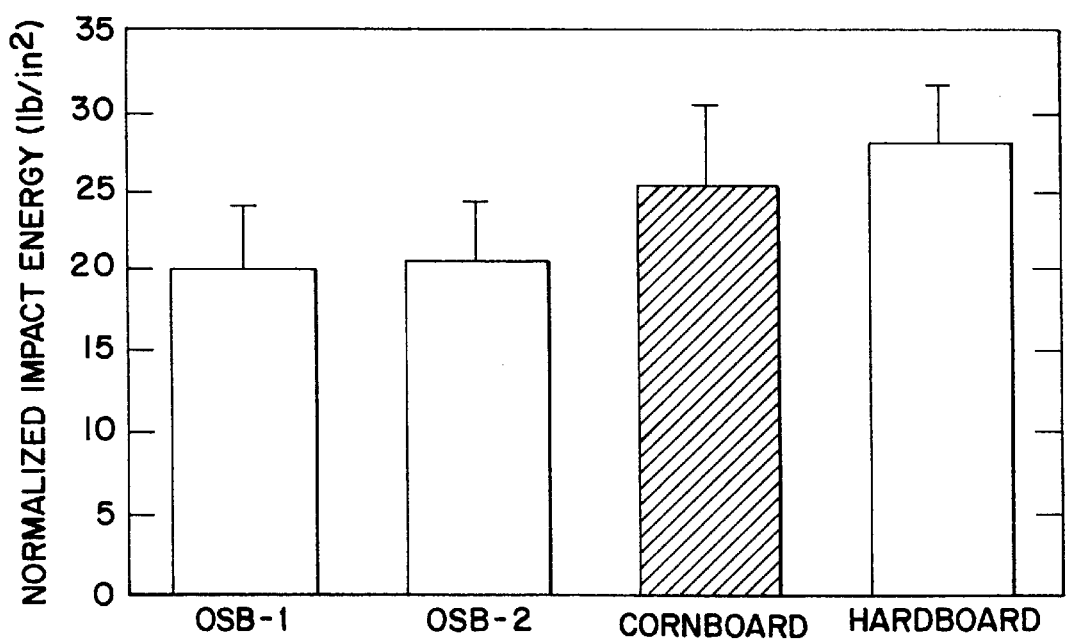
FIG. 2 shows the normalized impact energy of a corn-based laminated polymer composite (cornboard) compared to laminated composites made using wood-based reinforcements (Hardboard, OSB-1, OSB-2)

The impact response of quasi-isotropic husk laminates was measured as described in Example 1. A comparison of the results to two grades of OSB (oriented strand board) and masonite (hardboard) is shown in FIG. 2. Both the OSB and hardboard were fabricated using a phenol-formaldehyde resin, while the corn husk reinforced board used an epoxy matrix. The results have been normalized with respect to the plate thickness. The cornboard was found to be significantly more resistant to impact than either of the OSB grades and it compared favorably with the hardboard.

Table 1, below, summarizes the results of tensile tests on quasi-unidirectional husk laminates. Both longitudinal and transverse specimens were tested.

TABLE 1

| Test Direction | Elastic Modulus (GPa) | Tensile Strength (MPa) |
|---|---|---|
| Longitudinal to the husk | 3.37 | 32 |
| Transverse to the husk | 1.97 | 15 |

The data demonstrated that longitudinal reinforcement showed the highest strength and stiffness. The ratio of longitudinal to transverse moduli and strength was 1.71 and 2.13, respectively. The data in Table 2, below, compares the properties of the husk-reinforced epoxy composite with OSB particle board with a phenol-formaldehyde matrix.

TABLE 2

| Test Direction | Elastic Modulus (GPa) | Tensile Strength (MPa) |
|---|---|---|
| Longitudinal Corn Husk Reinforced Epoxy | 3.37 | 32 |
| Aspen Planar Shaving Particleboard | 2.5 | 25 |

The data show that both the modulus and strength of longitudinal laminates exceeded those of particle board.

What is claimed is:

1. Amended a structural polymeric composite consisting essentially of a polymer matrix and intact corn husks.

2. The composite of claim 1 wherein the structural composite is a laminated polymer composite.

3. The composite of claim 1 wherein the polymer matrix is an epoxy resin, phenol-formaldehyde, or a polyester.

4. The composite of claim 1, wherein each of the corn husks has elongate fibers aligned with a first line along the length of each husk, and the corn husks are disposed in a corn husk layer such that the first lines of the corn husks are aligned in the corn husk layer.

5. The composite of claim 1, wherein each of the corn husks has elongate fibers aligned with a first line along the length of each husk, and the corn husks are disposed in a corn husk layer such that the first lines of the corn husks are randomly oriented in the corn husk layer.

* * * * *